US010439250B2

(12) United States Patent
Schwanz et al.

(10) Patent No.: US 10,439,250 B2
(45) Date of Patent: Oct. 8, 2019

(54) SOLID-STATE ELECTROLYTES AND BATTERIES MADE THEREFROM, AND METHODS OF MAKING SOLID-STATE ELECTROLYTES

(71) Applicant: Purdue Research Foundation, West Lafayette, IN (US)

(72) Inventors: Derek Karl Schwanz, Inver Grove Heights, MN (US); Esteban Ernesto Marinero-Caceres, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 555 days.

(21) Appl. No.: 14/937,747

(22) Filed: Nov. 10, 2015

(65) Prior Publication Data

US 2016/0133990 A1    May 12, 2016

Related U.S. Application Data

(60) Provisional application No. 62/078,175, filed on Nov. 11, 2014.

(51) Int. Cl.
*H01M 10/0562* (2010.01)
*H01M 10/0525* (2010.01)

(52) U.S. Cl.
CPC ... *H01M 10/0562* (2013.01); *H01M 10/0525* (2013.01); *H01M 2300/0071* (2013.01)

(58) Field of Classification Search
CPC ......................................... H01M 10/056–0562
See application file for complete search history.

(56) References Cited

U.S. PATENT DOCUMENTS

| 2014/0186720 A1* | 7/2014 | Kintaka | H01M 10/0562 |
| | | | 429/322 |
| 2016/0111751 A1* | 4/2016 | Badding | C01G 25/006 |
| | | | 429/322 |

FOREIGN PATENT DOCUMENTS

WO    WO 2014038521 A1 *    3/2014    .......... H01M 10/052

OTHER PUBLICATIONS

English Machine Translation of Yamada et al., WO 2014-038521 (Mar. 2014).*
Wagner, R. (2016). Synthesis, Crystal Structure, and Stability of Cubic Li(7-x)La(3)Zr(2-x)Bi(x)O(12). Inorganic Chemistry. 2016, 55, 23, 12211-12219, doi: 10.1021/acs.inorgchem.6b01825. (Year: 2016).*

(Continued)

*Primary Examiner* — Jonathan G Leong
*Assistant Examiner* — Jacob Buchanan
(74) *Attorney, Agent, or Firm* — Purdue Research Foundation (57) ABSTRACT

Method of making solid-state electrolyte with composition formula $Li_{7-x}La_3Zr_{2-x}Bi_xO_{12}$. The method includes making a polymerized complex of the metal-ions of the composition formula, and making an agglomerate therefrom to be calcined and sintered to produce the solid-state electrolyte. A solid-state electrolyte with the composition formula $Li_{7-x}La_3Zr_{2-x}Bi_xO_{12}$ with superior ionic conductivity by choice of the value of x and processing conditions. A battery employing a solid-state electrolyte of superior ionic conductivity with the composition formula $Li_{7-x}La_3Zr_{2-x}Bi_xO_{12}$.

5 Claims, 8 Drawing Sheets

(56) References Cited

OTHER PUBLICATIONS

Murugan, R., et al., Fast Lithium Ion Conduction in Garnet-Type Li7La3Zr2O12. Angew. Chem. Int. Ed. 2007, 46, 7778-7781.
Momma, K., et al., Vesta 3 for three-dimensional visualization of crystal, volumetric and morphology data. J. Appl. Cryst. (2011). 44, 1272-1276.

* cited by examiner

SOLID-STATE ELECTROLYTES AND BATTERIES MADE THEREFROM, AND METHODS OF MAKING SOLID-STATE ELECTROLYTES

CROSS-REFERENCE TO RELATED APPLICATIONS

The present U.S. patent application is related to and claims the priority benefit of U.S. Provisional Patent Application Ser. No. 62/078,175, filed Nov. 11, 2014, the contents of which are hereby incorporated by reference in their entirety into the present disclosure.

TECHNICAL FIELD

The present disclosure generally relates to methods of making solid-state electrolytes, especially those with high-ionic conductivity and especially for use in lithium-ion batteries.

BACKGROUND

This section introduces aspects that may help facilitate a better understanding of the disclosure. Accordingly, these statements are to be read in this light and are not to be understood as admissions about what is or is not prior art.

Lithium based battery systems are a clean and effective way to transport energy in our increasingly energy dependent society. With increasing demands for more power, much research is going into new cell architectures and chemistries, consequently increasing demands for stability, cyclability and safety. As an integral component of the battery, electrolytes lie at the crossroads of these ever-increasing needs. Conventional liquid electrolyte-salt combinations often result in safety issues and cell degradation due to inherent flaws such as dendritic growth and thermal runaway. Solid state electrolytes bring increased functionality to the cell in terms of increased stability and safety. However, in general, ionic transport through solid electrolyte materials is orders of magnitude lower than that through liquid electrolytes. If the ionic conductivity mechanisms and the fabrication of solid-state electrolyte materials capable of conducting Li-ions can be optimized, battery safety, lifetime and capacity can be improved significantly.

A newer class of materials discovered shows much promise as a solid state lithium-ion conductor. The garnet oxide of the stoichiometry $Li_7La_3Zr_2O_{12}$ (LLZO) offer a relatively high ionic conductivity and good chemical stability over a range of voltages. In the chemical mentioned above the individual numbers are usually, and at least in this disclosure, are referred to as the stoichiometry of the particular component. LLZO exists as two high-temperature polymorphs, a more ordered I41/acdZ tetragonal phase and an Ia-3d cubic phase featuring higher ionic conductivity in a more disordered lithium sub-lattice. A decrease in lithium site occupancy as well as changes in interatomic spacing have been attributed to the improvement of the ionic conductivity for cubic LLZO. Although these materials show promise, high temperatures are typically required to achieve the phase stabilization and densification necessary for the desirable material properties.

Site-specific aliovalent dopants have proven useful for tailoring the electrochemical material properties of LLZO through the modification of lattice spacings and overall garnet stoichiometry, allowing for lower temperature stabilization of the cubic phase. Early examinations of LLZO revealed Al impurities from sintering crucibles migrating through the grain boundaries and eventually into the garnet lattice, displacing Li ions in the structure and introducing $Li^+$ vacancies, preferentially stabilizing the cubic phase over the tetragonal phase. Dopants on the 24c $La^{3+}$ and 16a $Zr^{4+}$ sites have also been used to reduce the amount of $Li^+$ in order to maintain charge neutrality for higher valence species substituted for the $La^{3+}$ and $Zr^{4+}$ ions. Such studies have indicated that there is an optimum $Li^+$ occupancy to vacancy ratio providing the highest ionic conductivity. Additionally, aliovalent dopants modify the garnet lattice parameter and thereby the geometry of the lithium ion conduction channels. Thus, aliovalent dopants can simultaneously modify the lattice spacing and the stoichiometry of the garnet species, greatly affecting the lithium ion mobility through the structure.

The synthesis plays a key role in determining the properties of solid state ion conductors such as LLZO. Conventional ball milling and sintering techniques without dopants can require as much as 36 hours at 1230° C. for stabilization of the cubic phase and subsequent densification necessary to achieve ionic conductivities on the order of $10^{-3}$ S/cm. Sol-gel and polymerized complex fabrication techniques such as the Pechini method have been utilized to create a more homogeneous mixture of precursor materials, reducing the energy consumption required for achieving complete mixing. The above methods are either complex or require higher processing temperature making them energy intensive and unattractive.

Thus, there is an unmet need for methods of fabrication of solid-state electrolytes at lower temperatures and yet possessing lithium-ion mobility through the electrolyte suitable for lithium-based batteries.

SUMMARY

A method of fabricating a solid-state electrolyte is disclosed. In the method, first a lithium salt, a lanthanum salt, a zirconium salt, and a bismuth salt are dissolved into an acid diluted with water, wherein metal ions of lithium, lanthanum, zirconium, and bismuth are created in the acid diluted with water such that lithium, lanthanum, zirconium, and bismuth are in the proportion (7-x):3:(2-x):x respectively where x is in the range of 0.01-1.99. Next, a chelating agent capable of bonding to the metal ions is added to the metal ions resulting in a homogeneous chelated metal-ion mix. Then, an organic complexing agent is added to the chelated-metal ion mix, and the chelated-metal ion mix with the organic complex is held at a holding temperature for a holding time period resulting in a polymerized complex. The polymerized complex is then calcined at a calcining temperature for a calcining time period producing a precursor powder. The precursor powder is then compacted to produce an agglomerate, which is then sintered at a sintering temperature for a sintering time period, resulting in a solid-state electrolyte with the stoichiometric chemical formula $Li_{7-x}La_3Zr_{2-x}Bi_xO_{12}$. In this method, x which represents the stoichiometry of bismuth in the sold-state electrolyte so produced by this method is chosen depending on the ionic conductivities and/or grain size desired based on the experimental results reported in this disclosure.

A composition for a solid-state electrolyte is disclosed. The composition comprises ions of lithium, lanthanum, zirconium, bismuth, and oxygen with the composition formula $Li_{7-x}La_3Zr_{2-x}Bi_xO_{12}$ x is in the range of 0.01-1.9 and denotes the stoichiometric content of bismuth in the chemical formula $Li_{7-x}La_3Zr_{2-x}Bi_xO_{12}$.

A battery is disclosed. The battery includes an anode, a cathode, and a solid-state electrolyte comprising ions of lithium, lanthanum, zirconium, bismuth, and oxygen in a proportion given by chemical formula $Li_{7-x}La_3Zr_{2-x}Bi_xO_{12}$ wherein x is in the range 0.01-1.99 and denotes the stoichiometric content of bismuth in the chemical formula, and denotes the stoichiometric content of bismuth in the chemical formula $Li_{7-x}La_3Zr_{2-x}Bi_xO_{12}$.

A method of fabricating a solid-state electrolyte is disclosed. The method includes dissolving lithium nitrate, lanthanum nitrate, zirconium nitrate, and bismuth nitrate into nitric acid diluted with water, wherein metal ions of lithium, lanthanum, zirconium, and bismuth are created in the acid diluted with water such that lithium, lanthanum, zirconium, and bismuth are in the proportion (7-x):3:(2-x):x respectively wherein x wherein x is in the range of 0.01-1.99; adding citric acid to the metal ions producing a homogeneous citric acid-metal ion mix; adding ethylene glycol to the citric acid-metal ion mix; holding the citric acid-metal ion mix with the ethylene glycol at a holding temperature for a holding time period resulting in a polymerized complex; calcining the polymerized complex at a calcining temperature in the range of 500-950° C. for a calcining time period in the range of 0.5-10 hours producing a precursor powder; compacting the precursor powder to produce an agglomerate; and sintering the agglomerate at a sintering temperature in the range if 500-950° C. for a sintering time period in the range of 5-24 hours, resulting in a solid-state electrolyte with the stoichiometric chemical formula $Li_{7-x}La_3Zr_{2-x}Bi_xO_{12}$.

BRIEF DESCRIPTION OF DRAWINGS

While some of the figures shown herein may have been generated from scaled drawings or from photographs that are scalable, it is understood that such relative scaling within a figure are by way of example, and are not to be construed as limiting.

DETAILED DESCRIPTION

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, such alterations and further modifications in the illustrated device, and such further applications of the principles of the disclosure as illustrated therein being contemplated as would normally occur to one skilled in the art to which the disclosure relates.

This disclosure, among other things, describes an approach to synthesize cubic-phase fast ionic conducting garnet solid state electrolytes based on $Li_7La_3Zr_2O_{12}$. Utilizing the methods of this disclosure, ionic conductivities of the order of $1.2 \times 10^{-4}$ S/cm are readily achieved in structures which are not fully densified. Moreover, these results are accomplished at lower heat-treating or sintering temperatures than any previous approaches for fabrication of this type of complex oxide materials. For the purposes of this disclosure, lower sintering temperatures are considered to be in the range of 700-900° C., while higher temperatures previously utilized in sintering LLZO type materials not containing bismuth.

Garnet oxides of nominal composition $Li_{7-x}La_3Zr_{2-x}Bi_xO_{12}$ were fabricated by citrate-gel utilizing the Pechini method, known to those skilled in the art, varying x between 0.0 and 1.0. Reagent grade chemicals, $LiNO_3$, $La(NO_3)_3 \cdot 6H_2O$, $ZrO(NO_3)_2 \cdot xH_2O$, and $Bi(NO_3)_3 \cdot 5H_2O$ ($nH_2O$ representing the number of water molecules associated in each case) were dissolved along with chelating agent citric acid into dilute nitric acid. After complete dissolution of the solids, ethylene glycol was added as a complexing agent of the polymerized complex through polyesterfication of the chelated ionic compounds. To incorporate all the metal cations into the complex, a metal to organic ratio of 38:62 was used. In this context, the sum of citric acid and ethylene glycol represents the organic). Additionally, to avoid auto-ignition of the resulting polymer upon pyrolysis, a citric acid to ethylene glycol ratio of 40:60 was used. The resulting solution was stirred at 60° C. until a thick transparent gel was formed. This gel was then placed in an oven at 120° C. to evaporate any remaining solvents, leaving behind a brown, rubbery solid. This polymerized solid was analyzed via Thermogravimetric analysis (TGA) to determine the decomposition temperature of the complex through heating in a platinum pan at 20° C./min in air. In order to determine effects on phase evolution at low temperatures, the polymerized complex for compositions $Li_{7-x}La_3Zr_{2-x}Bi_xO_{12}$ x=0, 1.0 was calcined at temperatures between 600° C. and 700° C. for 10 hours with a ramp rate of 5° C./min. The range allowed for analysis of the evolution and stability of various oxides for given temperature as a function of Bi concentration. In the chemical composition formula $Li_{7-x}La_3Zr_{2-x}Bi_xO_{12}$, for purposes of this disclosure, x is termed as bismuth stoichiometry or Bi stoichiometry.

To better evaluate the effects of various Bi stoichiometric concentrations on material structure and property, pellets were fabricated of garnet oxides for compositions $Li_{7-x}La_3Zr_{2-x}Bi_xO_{12}$ for x=0, 0.25, 0.5, 0.75 and 1.0 from precursor powder calcined at 700° C. for 10 hours. The pellets were pressed into 12 mm diameter pellets at 40 MPa for 10 minutes and covered in precursor powder to inhibit Li and Bi volatilization at high temperature before being sintered at 900° C. for 10 hours. Electrodes were painted onto the pellet sides with silver paint and the pellets were characterized using a Solatron 1260 impedance analyzer in the frequency range of 300000 Hz to 0.0001 Hz. The paint was then polished off before the pellets were fractured and the pellets were then examined with a scanning electron microscope before being ground and analyzed via powder X-ray diffraction to determine their phase composition.

Figure 1:
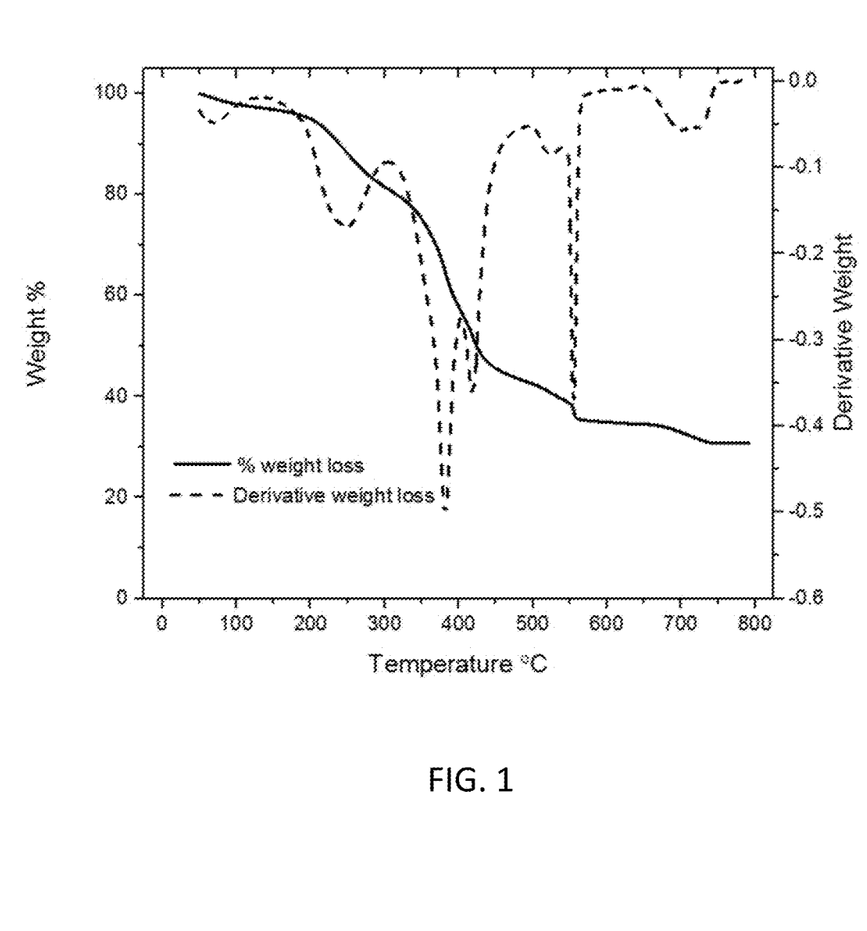
FIG. 1 shows weight loss as a function of temperature as well as its derivative for $Li_6La_3ZrBiO_{12}$ dried precursor powder.

FIG. 1 shows weight loss as a function of temperature as well as its derivative for $Li_6La_3ZrBiO_{12}$ dried precursor powder. Referring to FIG. 1, weight loss below 300° C. is attributed to additional evaporation of the solvent and losses at ~325° C. and 400° C. correspond to the volatilization of unreacted ethylene glycol and citric acid respectively. The large, rapid mass loss seen at 525° C. is attributed to rapid decomposition of the remaining polymerized complex, and subsequent oxidation of the metal ions associated with it. The final mass loss at around 700° C. can be ascribed to burnoff of residual carbon, a phenomenon observed with similar synthesis methods. Small amounts of carbonate formation were observed in the subsequent structural phase analysis, indicating incomplete oxidation of the metal ions contained in the polymerized complex. Calcination under flowing oxygen could be used to avoid this problem.

Figure 2:
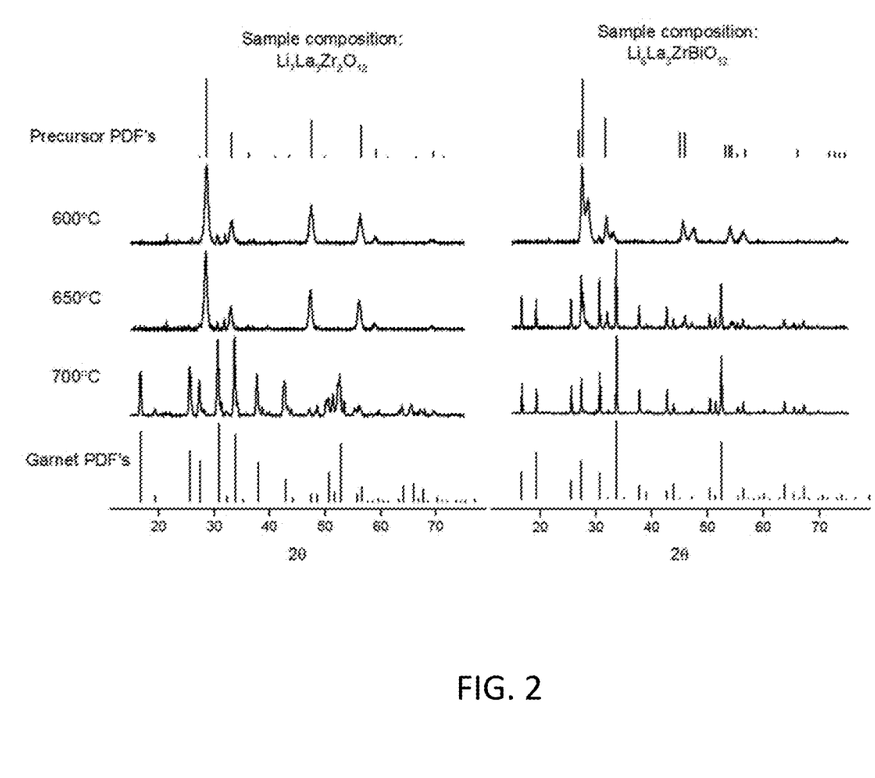
FIG. 2 shows the diffraction patterns of $Li_7La_3Zr_2O_{12}$ and $Li_6La_3ZrBiO_{12}$ powder calcined at 600° C., 650° C., and 700° C. respectively.

FIG. 2 shows the diffraction patterns of $Li_7La_3Zr_2O_{12}$ and $Li_6La_3ZrBiO_{12}$ powder calcined at 600° C., 650° C., and 700° C. In agreement with similar studies, the dopant-free LLZO converts from the $La_2Zr_2O_7$ pyrochlore-type phase of space group Fd-3mZ into an Ia-3d garnet type phase between 650° C. and 700° C. However, the sample containing Bi substituted onto the 16a $Zr^{4+}$ site undergoes a phase transformation into the garnet structure between 600° C. and 650° C. The Bi containing sample stably forms a mixture of the $La_2Zr_2O_7$ along with R-3mH $BiLa_2O_{4.5}$ phase at 600° C., which transforms into a cubic garnet oxide at 650° C. This reduction in temperature for the phase transition is attributed to Bi lowering the thermal activation necessary for phase formation. The phase formed with Bi has a lower $Li^+$ site occupancy and thus requires less thermal energy to get the $Li^+$ ions into the correct ordering. $Li_5La_3Bi_2O_{12}$ is reported to form a garnet phase between 600° C. and 650° C., but even with a higher $Li^+$ site-occupancy, $Li_6La_3ZrBiO_{12}$ garnets also make the lower phase transition. Furthermore, the $Li_6La_3ZrBiO_{12}$ sample calcined at 650° C. also contains small amounts of the precursor phases, indicated by slight peak broadening at the corresponding places in the diffraction pattern. This incomplete conversion suggests a diffusion controlled phase transition to the cubic garnet phase.

Figure 3A:
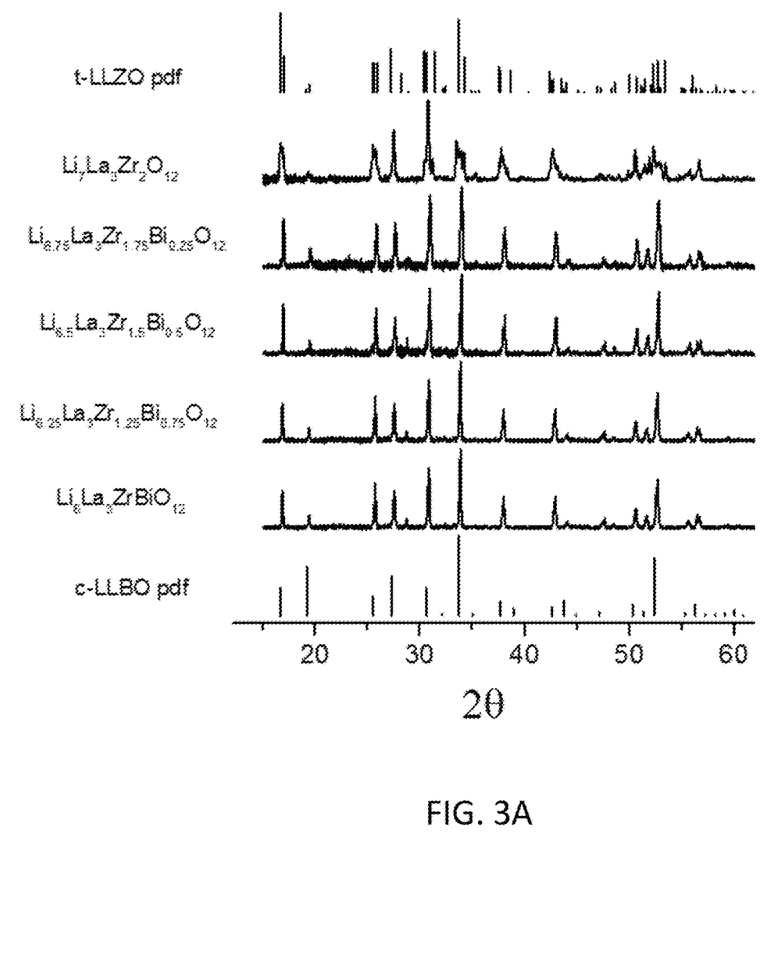
FIG. 3A shows diffraction patterns of $Li_{7-x}La_3Zr_{2-x}Bi_xO_{12}$ samples sintered at 900° C. for 10 hours.
Figure 3B:
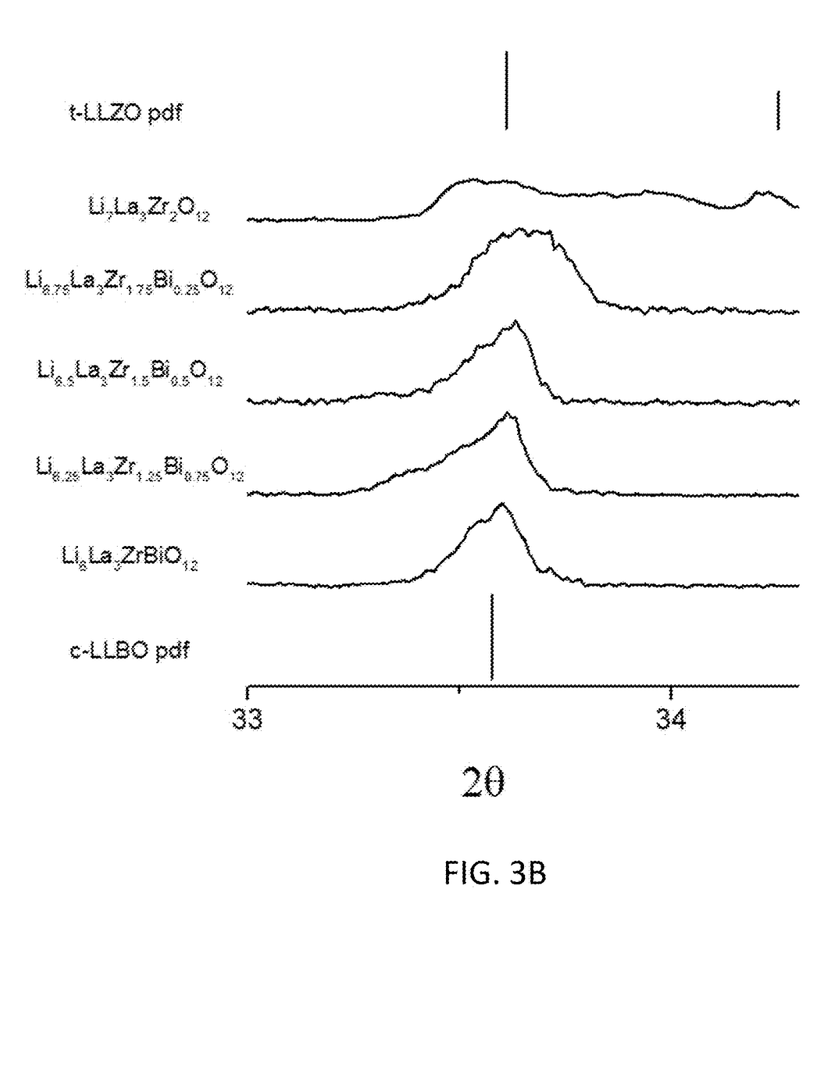
FIG. 3B shows diffraction pattern shown in FIG. 3A with selected range of 2θ expanded.

FIG. 3A shows diffraction patterns of $Li_{7-x}La_3Zr_{2-x}Bi_xO_{12}$ samples sintered at 900° C. for 10 hours. These plots are usual intensity vs. 2θ plots with meaning well known to those skillet din the art. The patterns show cubic garnet phases for all samples subjected to the sintering heat treatment. All Bismuth containing samples convert to the cubic Ia-3d garnet examined in FIG. 2. However the $Li_7La_3Zr_2O_{12}$ samples only stabilize as I41/acdZ tetragonal garnet phase with a more ordered $Li^+$ sub-lattice. With the conversion of the garnet to cubic phase, even with a $Bi^{5+}:Zr^{4+}$ ratio of 0.125 indicates that even small amounts aliovalent dopants allow preferential stabilization of this more disordered phase. This is likely caused by an increased amount of vacancies on the $Li^+$ sub-lattice, establishing favorable conditions for the cubic structure to form over the more ordered tetragonal phase, which has 100% $Li^+$ site occupancy. It should be also noted that the crystallite size also significantly increases as the FWHM (full width half max as known to those skilled in X-ray crystallographic studies) of the peaks increases with increasing Bi inclusion into the compound, demonstrating a correlation between increased particle growth and Bi concentration. This is shown in FIG. 3B where a selected portion of 2θ is expanded to demonstrate the peak broadening as bismuth content decreases, which is indicative of decreasing crystallite size decreasing bismuth content.

Figure 4A:
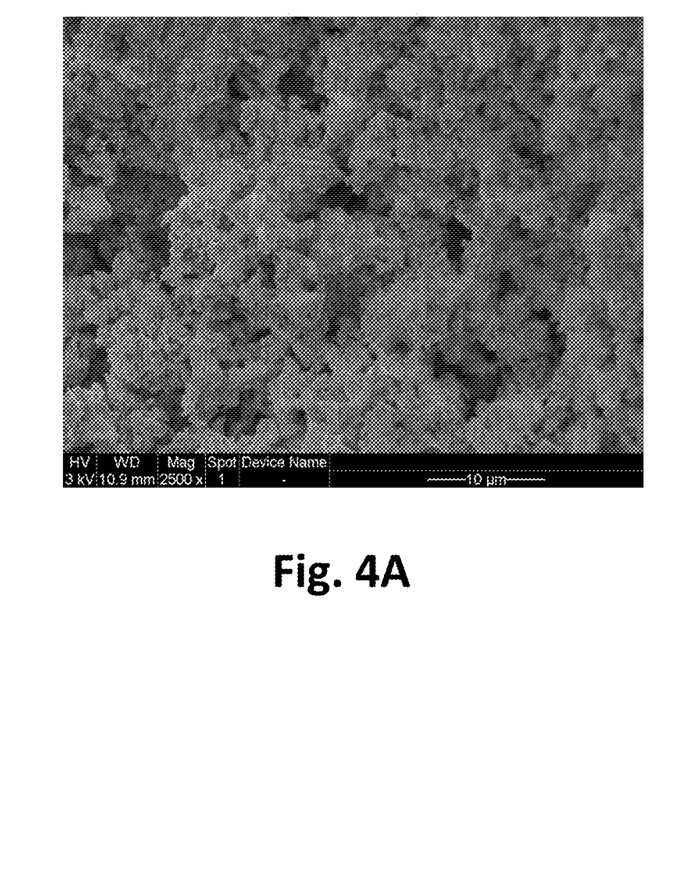
FIGS. 4A and 4B show differences in the microstructural features between garnet oxide samples without bismuth and with bismuth respectively, in the form of a precursor powder prior to sintering.
Figure 4B:
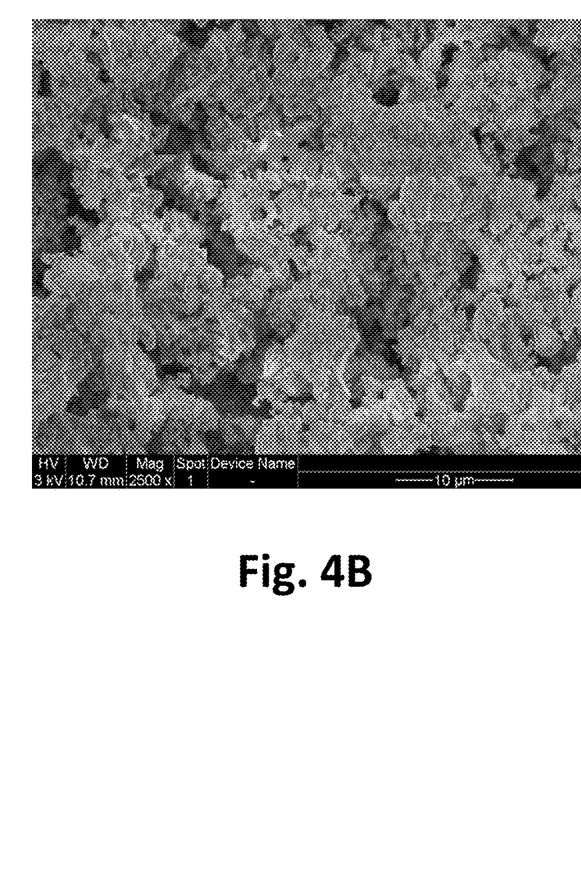
Figure 4C:
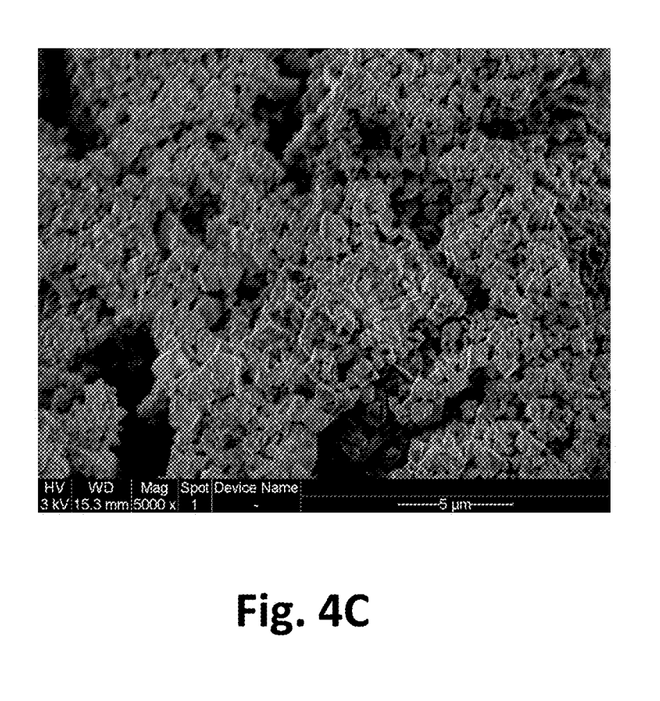
FIGS. 4C and 4D show differences in the microstructural features between sintered garnet oxide samples without bismuth and with bismuth respectively.
Figure 4D:
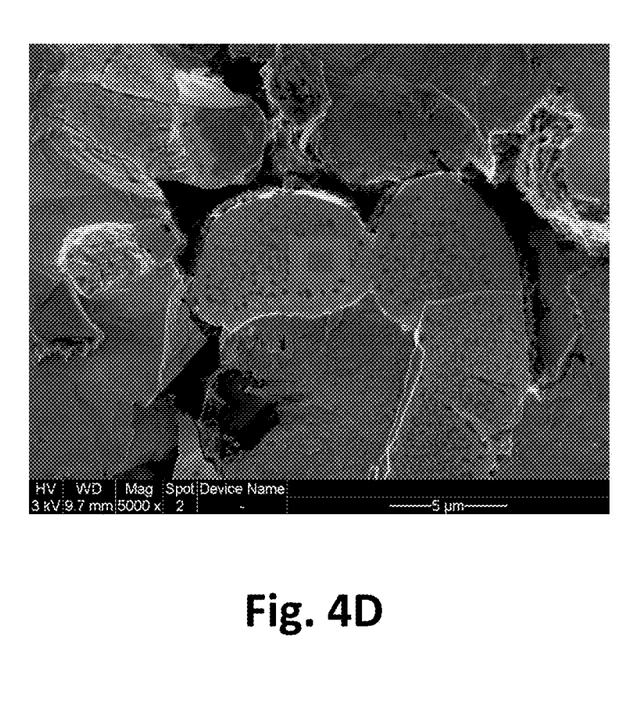

FIGS. 4A and 4B show scanning electron microscope images of the microstructural features for garnet oxide samples without bismuth and with bismuth respectively, in the precursor powders prior to sintering. Referring to FIGS. 4A and 4B, scanning electron microscope (SEM) images in FIG. 4A and FIG. 4B show the precursor powders of $Li_7La_3Zr_2O_{12}$ and $Li_6La_3ZrBiO_{12}$ respectively, calcined at 700° C. There is a slightly larger particle size with the addition of bismuth into the stoichiometry of LLZO samples examined here. Referring to FIGS. 4C and 4D, SEM images show fracture surfaces of $Li_7La_3Zr_2O_{12}$ and $Li_6La_3ZrBiO_{12}$ respectively, sintered at 900° C. after calcining the precursor powder at 700° C. FIG. 4C shows an image of fracture surface of $Li_7La_3Zr_2O_{12}$ with small particle size (of the order of 1 μm) as well as minimal amounts of sintering actually occurring. FIG. 4D shows SEM image of the corresponding fracture surface for the $Li_6La_3ZrBiO_{12}$ sample having undergone the same heat treatment. Comparing FIGS. 4C and 4D, it can be noted that FIG. 4D shows significantly larger particle size (of the order of 10 μm) and densification for the sample containing bismuth. It is readily apparent that bismuth acts as a significant contributor to enhanced grain growth at low temperatures as well as increased densification. Although calcined powders show little variation in particle size, there is disproportionate, explosive grain growth for the $Li_6La_3ZrBiO_{12}$ sample upon sintering at 900° C. A possible explanation for the observed results can be summarized as follows: Bismuth is an element with a relatively low melting point, and is an element capable of forming relatively low melting point oxides (e.g. $Bi_2O_3$). Bismuth has also a propensity to form low melting eutectic compounds in conjunction with other oxides. At sintering temperatures, the formation of pseudo-liquid phases is feasible, thereby dramatically enhancing diffusion kinetics resulting in extremely rapid grain growth when sintered above a critical temperature. The images of FIGS. 4A through 4D clearly indicate bismuth acting as an enabler for enhanced densification and subsequent grain growth at lower temperatures on these compounds than is possible without bismuth in the composition.

Figure 5:
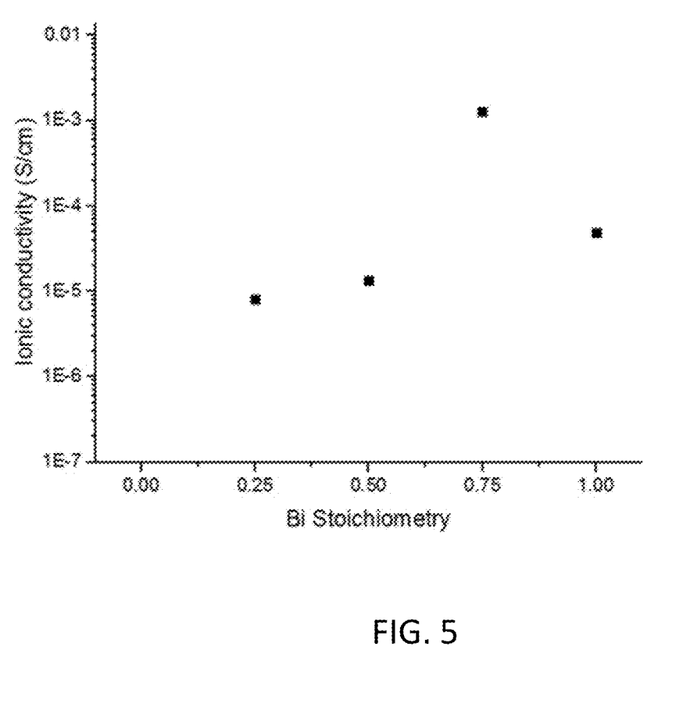
FIG. 5 is a plot of ionic conductivity of sintered $Li_{7-x}La_3Zr_{2-x}Bi_xO_{12}$ samples derived from the Nyquist plots as a function of bismuth stoichiometry.

Standard Nyquist plots for solid electrolytes modeled as resistive-capacitive species were obtained for $Li_{7-x}La_3Zr_{2-x}Bi_xO_{12}$ pellets sintered at 900° C. for 10 hours. The plots were analyzed using equivalent circuits models. The $Li_7La_3Zr_2O_{12}$ sample showed a significant jump in resistance when compared to the LLZO samples containing bismuth. This can be attributed to the low degree of densification and lack of sintering and particle growth at the low temperature of 900° C. for samples containing no bismuth. FIG. 5 is a plot of ionic conductivity of sintered $Li_{7-x}La_3Zr_{2-x}Bi_xO_{12}$ samples derived from the Nyquist plots as a function of bismuth content shown as bismuth stoichiometry. Referring to FIG. 5, the bismuth-containing samples feature ionic conductivity ranging from $10^{-8}$-$10^{-4}$ S/cm, significantly higher (non-measurable with the equipment employed) than sintered LLZO samples containing no bismuth, indicating that sintering temperatures as low as 900° C. are not sufficient to yield significant ionic conductivity in those samples. Furthermore, the cubic phase formed in the dense network of Bi-containing garnets allows for high ionic conductivity at room temperature. This in turn means LLZO samples without bismuth are not candidates for solid electrolyte applications unless sintering temperatures significantly higher than 900° C. are employed. Furthermore, the cubic phase formed in the dense network of Bi-containing garnets allows for high ionic conductivity at room temperature.

The major increase in ionic conductivity for samples of $Li_{7-x}La_3Zr_{2-x}Bi_xO_{12}$ wherein x=0.5 and x=0.75 can be attributed to the significantly increased densification from the sintering process as previously discussed. It should be noted that ionic conductivity of LLZO containing bismuth with x=0.25 shows appreciably higher ionic conductivity compared LLZO samples with no bismuth.

As the bismuth stoichiometry in the $Li_{7-x}La_3Zr_{2-x}Bi_xO_{12}$ garnets samples is varied, the $Li^+$ occupancy to vacancy ratio in the samples fluctuates proportionally, with each $Bi^{5+}$ creating an additional $Li^+$ vacancy. Thus, it is expected that samples of $Li_{7-x}La_3Zr_{2-x}Bi_xO_{12}$ garnets with x=0.75 and x=1.0 would have different ratios of Li sub-lattice occupancy for the same garnet crystal structure. This variance in stoichiometry accounts for a change in the electronic structure of the material and thus the decrease in the ionic conductivity of $1.80 \times 10^{-4}$ S/cm for the sample with x=0.75 sample to $2.19 \times 10^{-5}$ S/cm for the sample with x=1.0. Thus in this study, the extreme microstructural dependence on Bi composition requires invoking both densification and site occupation mechanisms to be taken into account to explain the observed conductivity behavior. The effects of densification and stoichiometric variation are both contributing in determining ionic conductivity. For compositions with low Bi stoichiometry (x=0.25, 0.5), there is not enough thermal activation to sufficiently densify the samples to maximize ionic conductivity, even if the electronic structure would present better results given lattice spacing and $Li^+$ occupancy ratio. A composition with high Bi stoichiometry x=1.0 showed significantly more densification.

Thus, with the two mechanisms for enhanced material performance, samples sintered at 900° C. have an optimized composition of $Li_{6.25}La_3Zr_{1.25}Bi_{0.75}O_{12}$ because the samples with a lower Bi stoichiometry do not have sufficient dopant to enable grain growth and densification required for useful ionic conductivity values. As such, it is likely that the maximum ionic conductivity observed for this system under the processing conditions presented here is not the composition for the highest possible ionic conductivity utilizing Bi as an aliovalent dopant. However, for the processing parameters studied here, the tradeoff between $Li^+$ site occupancy and densification allows for this composition to present the most desirable properties for a given thermal activation process. Other compositions with better properties could be achieved through the optimization of heat treatment and stoichiometry. In other words, sintering times at a given temperature or sintering temperatures at a given time have to be investigated in order to optimize the densification and maximize the ionic conductivity.

The incorporation of Bi into the garnet oxide structure through Pechini method style polymerized complex processing allows for a lower temperature stabilization of cubic garnets as well as augmented grain growth and densification, both of which are desirable attributes for the fabrication and incorporation of garnet oxides into cyclable battery cells. As the stoichiometry of Bi in the garnet is changed systematically, it is observed that increased amounts of Bi help to densify the material at lower temperatures, while simultaneously improving the ionic conductivity. The high ionic conductivity is seen for a composition of $Li_{6.25}La_3Zr_{1.25}Bi_{0.75}O_{12}$, which had enough Bi to enable low temperature densification, concurrently having a near-optimized $Li^+$ occupancy ratio on the sub-lattice. This composition is only the optimized maximum for garnets sintered at 900° C., and with the decreased heat treatment could be inferior to that of $Li_6La_3ZrBiO_{12}$. The same could be said for increased heat treatment and lower concentrations of Bi. Therefore, garnets oxides need to have optimized heat treatments for every stoichiometry to tailor the processing conditions to the structural and thereby properties of the material.

Figure 6:
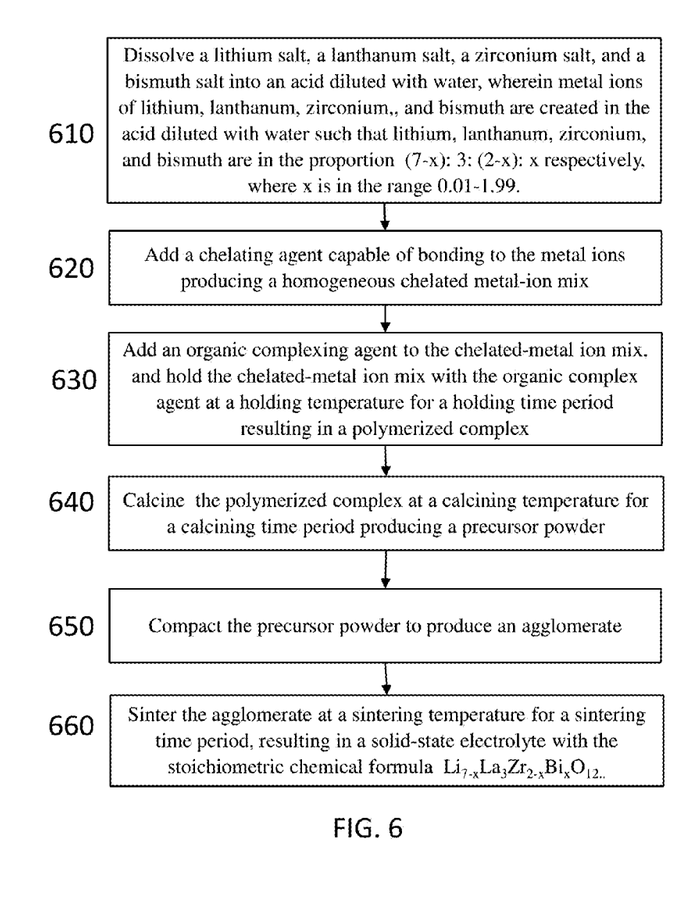
FIG. 6 is a flow-chart outlining the method of producing a solid-state electrolyte containing bismuth according to this disclosure.

Based on the above description, we now have a method to fabricate solid-state electrolytes containing bismuth with improved ionic conductivity. FIG. 6 is a flow-chart outlining the method of producing a $Li_{7-x}La_3Zr_{2-x}Bi_xO_{12}$ solid-state electrolyte containing bismuth according to this disclosure. In the method, first a lithium salt, a lanthanum salt, a zirconium salt, and a bismuth salt are dissolved into an acid diluted with water, wherein metal ions of lithium, lanthanum, zirconium, and bismuth are created in the acid diluted with water such that lithium, lanthanum, zirconium, and bismuth are in the proportion (7-x):3:(2-x):x where is a positive number, including various combinations of integers and fractions or decimals. A non-limiting example of a salt for each of lithium, lanthanum, zirconium and bismuth is a nitrate of the respective element. Other salts of these elements can be used, such as but not limited to, hydroxides, chlorides, oxides, carbonates, and acetates of the elements lithium, lanthanum, zirconium and bismuth. Further, chemical compounds that may contain more than one of the elements lithium, lanthanum, zirconium, and bismuth can be employed as a source for metal ions from the compounds in place of the individual salts as a source for the needed elements. One example of such a compound is lanthanum zirconium oxide with the chemical composition formula $La_2Zr_2O_7$. A non-limiting example of an acid used in this method is nitric acid. Use of other acids is also contemplated. Next, a chelating agent capable of bonding to the metal ions is added to the metal ions resulting in a homogeneous chelated metal-ion mix. Due to the dissolution of metal ions in the acid and the chelating aspect of the process the chelated metal-ion mix is a homogenous mixture. An example of a chelating agent is citric acid used in the experiments described above. Examples of chelating agents suitable for this purpose include, but not limited to Ethylenediaminetetraacetic acid (EDTA). Then, an organic complexing agent is added to the chelated-metal ion mix, and the chelated-metal ion mix with the organic complex is held at a holding temperature for a holding time period resulting in a polymerized complex. Examples of organic complexes suitable for this purpose. i.e., capable of producing a polymerized mix, include, but not limited to ethylene glycol, which was used in the experiments described above. A non-limiting range for the holding temperature is 50-80° C. and a non-limiting range the holding time period is in the range of 24-48 hours. The polymerized complex is then calcined at a calcining temperature for a calcining time period producing a precursor powder. A non-limiting range for the calcining temperature is 500-950° C. and a non-limiting range the calcining time period is in the range of 0.5-10 hours. The precursor powder is then compacted to produce an agglomerate, which is then sintered at a sintering temperature for a sintering time period, resulting in a solid-state electrolyte with the stoichiometric chemical formula $Li_{7-x}La_3Zr_{2-x}Bi_xO_{12}$. A non-limiting range for the sintering temperature is 500-950° C. and a non-limiting range the sintering time period is in the range of 5-24 hours. In this method, x which represents the stoichiometry of bismuth in the sold-state electrolyte so produced by this method is chosen depending on the ionic conductivities and/or grain size desired based on the experimental results reported in this disclosure. Thus, x can very between 0.01-1.99 as a non-limiting range. A preferred range for x based on ionic conductivity measurements in experiments leading to this disclosure is 0.5-1.00.

It is an objective of this disclosure to describe a composition formula for a solid-state electrolyte of superior ionic conductivity. Based on the experimental results described above, a composition for a solid-state electrolyte comprising ions of lithium, lanthanum, zirconium, bismuth, and oxygen is $Li_{7-x}La_3Zr_{2-x}Bi_xO_{12}$ wherein x is in the range 0.01-1.99 and denotes the stoichiometric content of bismuth in the composition formula $Li_{7-x}La_3Zr_{2-x}Bi_xO_{12}$. A preferred range for x based on ionic conductivity measurements in experiments leading to this disclosure is 0.5-1.00. Further, as demonstrated in the experiments reported above, the grain size of $Li_{7-x}La_3Zr_{2-x}Bi_xO_{12}$ can vary depending on bismuth content, processing conditions, especially calcining and sintering temperatures and times. Thus, a non-limiting average grain size for the composition formula $Li_{7-x}La_3Zr_{2-x}Bi_xO_{12}$ of this disclosure is 1-25 μm.

Solid-state electrolytes described and disclosed in this disclosure can be advantageously employed as electrolytes in a battery. Thus an embodiment of this disclosure is a battery employing $Li_{7-x}La_3Zr_{2-x}Bi_xO_{12}$ as a solid-electrolyte, wherein x is in the range of 0.01-1.99 and denotes the stoichiometric content of bismuth in the chemical formula $Li_{7-x}La_3Zr_{2-x}Bi_xO_{12}$. A preferred range for x in the composition formula of these electrolytes suitable for use as electrolytes in a battery is 0.25-1.00. A preferred embodiment of a battery of this disclosure is a battery based on a lithium pair chemistry. Examples of lithium pair chemistries suitable for a battery of this disclosure include, but not limited to, lithium-ion, lithium-sulphur, and lithium-air. Making batteries with a solid-state electrolyte is well known to those skilled in the art and has been well described in literature. Thus making batteries utilizing the solid-stage electrolytes of this disclosure can be accomplished by those skilled in the art without undue experimentation.

A preferred embodiment of method of fabricating a solid-state electrolyte is described below. The method involves dissolving lithium nitrate, lanthanum nitrate, zirconium nitrate, and bismuth nitrate into nitric acid diluted with water, wherein metal ions of lithium, lanthanum, zirconium, and bismuth are created in the acid diluted with water such that lithium, lanthanum, zirconium, and bismuth are in the proportion (7-x):3:(2-x):x respectively where x is in the range of 0.01-1.99. Next, citric acid is added to the metal ions producing a citric acid-metal ion mix. Next, organic complexing agent ethylene glycol is added to the citric acid-metal ion mix. The citric acid-metal ion mix with the ethylene glycol is then held at a holding temperature for a holding time period resulting in a polymerized complex. The polymerized complex is then claimed at a calcining temperature in the range of 500-950° C. for a calcining time period in the range of 0.5-10 hours producing a precursor powder. The precursor powder is compacted to produce an agglomerate, which is then sintered at a sintering temperature in the range of 500-950° C. for a sintering time period in the range of 5-24 hours, resulting in a solid-state electrolyte with the stoichiometric chemical formula $Li_{7-x}La_3Zr_{2-x}Bi_xO_{12}$.

While the present disclosure has been described with reference to certain embodiments, it will be apparent to those of ordinary skill in the art that other embodiments and implementations are possible that are within the scope of the present disclosure without departing from the spirit and scope of the present disclosure. Thus, the implementations should not be limited to the particular limitations described. Other implementations may be possible. It is therefore intended that the foregoing detailed description be regarded as illustrative rather than limiting. Thus, this disclosure is limited only by the following claims.

The invention claimed is:

1. A solid-state electrolyte comprising ions of lithium, lanthanum, zirconium, bismuth, and oxygen in a proportion given by chemical composition formula $Li_{7-x}La_3Zr_{2-x}Bi_xO_{12}$ wherein x is about 0.75 and denotes the stoichiometric content of bismuth in the chemical formula $Li_{7-x}La_3Zr_{2-x}Bi_xO_{12}$, wherein the solid-state electrolyte has a grain size in the range of 11-25 μm, and wherein the solid-state electrolyte has ionic conductivity of about $10^{-3}$ S/cm.

2. A battery comprising:
an anode;
a cathode; and
a solid-state electrolyte comprising ions of lithium, lanthanum, zirconium, bismuth, and oxygen in a proportion given by chemical composition formula $Li_{7-x}La_3Zr_{2-x}Bi_xO_{12}$ wherein x is about 0.75 and denotes the stoichiometric content of bismuth in the chemical formula $Li_{7-x}La_3Zr_{2-x}Bi_xO_{12}$, wherein the solid-state electrolyte has a grain size in the range of 11-25μm, and wherein the solid-state electrolyte has ionic conductivity of about $10^{-3}$ S/cm.

3. The battery of claim 2, the battery is based on a lithium pair chemistry.

4. The battery of claim 3, the lithium pair is one of lithium-ion, lithium-sulphur and lithium-air.

5. The battery of claim 2, wherein the solid-state electrolyte is made by a method comprising the steps of dissolving a lithium salt, a lanthanum salt, a zirconium salt, and a bismuth salt into an acid diluted with water, wherein metal ions of lithium, lanthanum, zirconium, and bismuth are created in the acid diluted with water such that lithium, lanthanum, zirconium, and bismuth are in the proportion (7-x):3:(2-x):x respectively, adding a chelating agent capable of bonding to the metal ions producing a homogeneous chelated metal-ion mix; adding an organic complexing agent to the chelated-metal ion mix; holding the chelated-metal ion mix with the organic complex agent at a holding temperature for a holding time period resulting in a polymerized complex; calcining the polymerized complex at a calcining temperature for a calcining time period producing a precursor powder; compacting the precursor powder to produce an agglomerate; and sintering the agglomerate at a sintering temperature for a sintering time period , resulting in a solid-state electrolyte with the stoichiometric chemical formula $Li_{7-x}La_3Zr_{2-x}Bi_xO_{12}$.

* * * * *